J. F. O'CONNOR.
MECHANICAL MOVEMENT.
APPLICATION FILED JUNE 30, 1921.
1,407,883.
Patented Feb. 28, 1922.
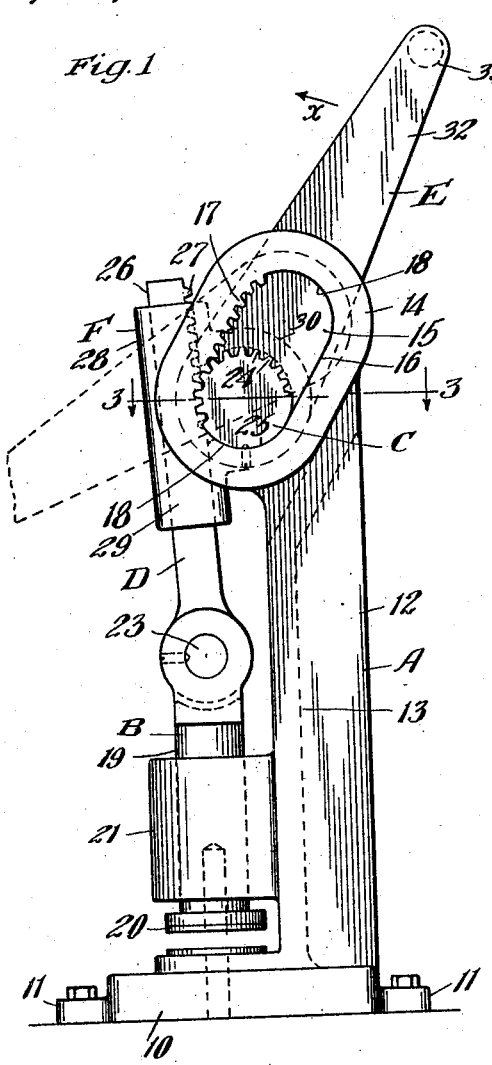
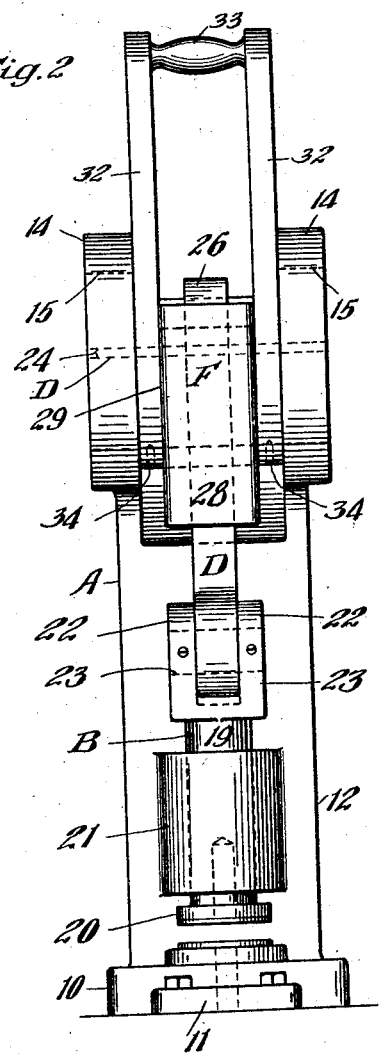
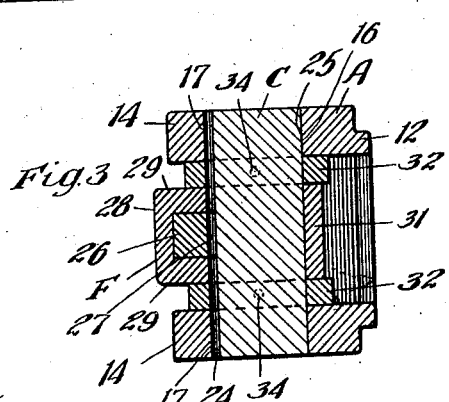
Witnesses
Wm. Geiger
Inventor
John F. O'Connor
By Geo. L. Haight
His Atty.

UNITED STATES PATENT OFFICE.

JOHN F. O'CONNOR, OF CHICAGO, ILLINOIS, ASSIGNOR TO WILLIAM H. MINER, OF CHAZY, NEW YORK.

MECHANICAL MOVEMENT.

1,407,883.　　　Specification of Letters Patent.　Patented Feb. 28, 1922.

Application filed June 30, 1921. Serial No. 481,554.

*To all whom it may concern:*

Be it known that I, JOHN F. O'CONNOR, a citizen of the United States, residing at Chicago, in the county of Cook and State of Illinois, have invented a certain new and useful Improvement in Mechanical Movements, of which the following is a full, clear, concise, and exact description, reference being had to the accompanying drawings, forming a part of this specification.

This invention relates to improvements in mechanical movement.

The object of the invention is to provide a simple and efficient mechanism for exerting high pressure when desired, as for instance, in hand power presses, paper cutters and other devices.

In the drawing forming part of this specification, I have illustrated one useful embodiment of the mechanical movement, the embodiment being shown in a hand power press. In said drawing Fig. 1 is an elevational view of such a power press. Fig. 2 is an elevational view of the structure illustrated in Fig. 1 but taken at right angles thereto. And Fig. 3 is a horizontal sectional view corresponding substantially to the line 3—3 of Fig. 1.

In said drawing, A denotes a support or standard; B a reciprocating plunger; C a gear; D a rack bar link; and E an operating lever.

The standard or support A is formed at the bottom thereof with a widened flange 10 with suitable perforated lugs 11—11 by which it may be bolted or screwed in fixed position on a table or other member. From the base flange 10 extends upwardly a post or leg 12 which is suitably cored as indicated at 13 to provide a substantially U-cross section. At the upper end of the post 12, the same is forked so as to provide two wings 14—14. In each of said wings 14 is formed an elongated opening or recess 15 having one plane edge 16, a rack edge 17 and rounded ends 18—18. The edges 16 and 17 extend at a comparatively acute angle with respect to the vertical or line of reciprocation of the plunger B, for the purposes hereinafter described.

The plunger B has a cylindrical shank 19 carrying at the lower end thereof a plate 20 for any desired purpose. Said shank 19 is guided in its vertical sliding movement in a suitable bearing 21 preferably formed integral with the support A. At its upper end, the shank 19 is forked as indicated at 22—22 and has pivotally connected thereto as by the pin 23, the lower end of the rack link D.

Mounted in the recesses 15 are the ends of the gear C. The latter preferably has longitudinally extending teeth 24—24 around slightly more than half of the periphery thereof, the remaining portion of the periphery of the gear or the pinion being cylindrical as indicated at 25. The teeth 24 are adapted to mesh with the teeth of the racks 17, as clearly appears from the drawing.

The shank of the rack link D is preferably rectangular as best indicated at 26 in Fig. 3, said shank having a straight rack 27 along its inner face, said rack 27 meshing with the teeth 24 of the gear C at the center of the latter.

The link D is slidingly mounted within a housing designated generally by the reference F. Said housing has an outer straight wall 28, parallel side walls 29—29, the latter having circular extensions 30—30, united by an inner cross web 31. Said extensions 30 are cut away so as to allow the passage of the gear C therethrough and the connecting web 31 fits over the gear C as best shown in Fig 3. In this manner, the housing may be said to be loosely rotatably mounted with respect to the gear C, and the two will travel in unison, as will be obvious. Furthermore, by this arrangement, the rack 27 is always maintained in engagement with the gear C and cannot become disengaged therefrom.

A lever E, as shown, comprises two side arms 32—32 united at the top by a cross handle 33. The lower ends of the arms 32 are apertured to accommodate the gear C therein as shown in Fig. 3. In order to rotate the gear C in unison with movement of the lever E, the gear is rigidly secured to the lever E as by set-screws 34—34.

The position of the parts as shown by the full lines in Fig. 1, is that obtaining when the plunger B is in its uppermost position. To depress the plunger B and thereby apply the desired pressure to whatever may be beneath it, the lever E is pulled or rotated in the direction indicated by the arrow *x*, that is, counter clockwise. As the lever E is pulled in a counter clockwise direction, it is evident that the gear C will be compelled to travel upwardly along the racks 17—17. Simultaneously therewith, the rack 27 of the link D will be forced downwardly with respect to the housing F. In view of the fact that the gear C, in its bodily upward movement, does not move in a path directly parallel to the line of movement of the plunger B, said gear C will have a component of travel in a horizontal direction depending upon the angle of the recesses 15, with respect to the vertical. Consequently the link D will be forced downwardly with respect to the housing F, and the axis of the gear C at one rate and at the same time the gear C carrying the housing F with it will travel vertically at a slightly slower speed and the net advance of the link D and plunger B in a vertically downward direction will correspond to the difference between said two speeds. At the end of the actuating movement of the lever E, the gear C will be at the upper end of the recesses 15 and the plunger B will have been depressed the desired amount.

Assuming a certain force applied to the outer end of the lever E, this force will be multiplied in the first instance, in accordance with the ratio of the length of said lever from the center of the gear C to the radius of the gear C. This last force is again multiplied in accordance with the ratio of the vertical movement of the gear C to the horizontal movement thereof or displacement from a true vertical path of movement. By varying the slope of the recesses 15, it is evident that the last named ratio can be changed as desired to obtain greater or less pressure on the plunger B. The more nearly the recesses 15 approach a vertical position, the less the horizontal displacement of the gear C during this rotation, the less the net downward movement imparted to the link D and plunger B and the greater the leverage ratio as will be understood.

By placing the racks 17 on the sides of the recesses nearest the rack 27, the gear C is compelled to travel upwardly when the lever E is pulled downwardly, which facilitates the operation.

I have herein shown only one embodiment of the invention and its application to a practical use. The same is by way of illustration only and not by way of limitation. All changes and modifications are contemplated that come within the scope of the claims appended hereto.

I claim:

1. In a mechanical movement, the combination with a reciprocating element for transmitting force; of a support having a stationary rack extending angularly with respect to the line of reciprocation of said element; a link pivotally connected to said element and having a rack thereon; a travelling gear in mesh with both of said racks; and means for rotating said gear.

2. In a mechanical movement, the combination with a reciprocating element for transmitting force; of a support having a stationary rack extending angularly with respect to the line of reciprocation of said element; a link pivotally connected to said element and having a rack thereon; a travelling gear in mesh with both of said racks; a housing in which said link is slidably mounted and in which said gear is journaled; and means for rotating said gear.

3. In a mechanical movement, the combination with a support having a recess therein, one side of said recess being provided with a rack; of a travelling gear extending within said recess and in mesh with said rack; means for rotating said gear; a housing loosely journaled on said gear; and a member slidably mounted in said housing, said member having a rack on one face thereof in mesh with said gear.

4. In a mechanical movement, the combination with a support extending in a generally vertical direction, said support having a vertical guide near the bottom thereof and provided near the top thereof with a recess extending at an angle to the vertical, one side of said recess being provided with a rack; of a vertical reciprocating element cooperable with said guide; a gear extending within said recess and in mesh with said rack; a link pivotally connected to the upper end of said element, said link having a straight rack also in mesh with said gear, both of said racks engaging said gear on the same side of the latter.

5. In a mechanical movement, the combination with a support extending in a generally vertical direction, said support having a vertical guide near the bottom thereof and provided near the top thereof with a recess extending at an angle to the vertical, one side of said recess being provided with a rack; of a vertical reciprocating element cooperable with said guide; a gear extending within said recess and in mesh with said rack; a link pivotally connected to the upper end of said element, said link having a straight rack also in mesh with said gear, both of said racks engaging said gear on the same side of the latter; and a housing in which said link is slidably mounted, said housing being journaled on said gear and adapted to travel bodily with the latter.

6. In a mechanical movement, the combination with a support having a vertically extending arm, said arm at the top thereof being provided with a recess extending at an angle to the vertical, one side of said recess being formed to provide a rack; of a pressure transmitting element vertically slidably mounted on said support; a link pivotally attached to said element, said link having a rack extending along one face thereof; a gear extending within said recess and meshing with the rack edge thereof and also with the rack of the link, both engagements of said gear with the racks being on the same side of the gear; a housing in which said link is slidably mounted, said housing having portions thereof in which said gear is rotatably mounted, said housing travelling with the gear; and means for rotating said gear.

7. In a mechanical movement, the combination with a standard having a base and an upstanding arm, the upper end of the arm being forked to provide two laterally separated wings, said wings being provided with alined recesses extending in a direction at an angle to the vertical, corresponding edges of said recesses having teeth to define a rack; a gear journaled at its ends in said recesses and cooperable with said racks; a plunger vertically slidably mounted on said standard; a link pivotally attached to the upper end of said plunger, said link having a rack face engaging with said gear between said wings; a housing in which said link is slidably mounted, said housing having portions thereof encircling said gear thereby adapting the housing to travel with the gear; and means for rotating said gear.

In witness that I claim the foregoing I have hereunto subscribed my name this 24th day of June 1921.

JOHN F. O'CONNOR.

Witnesses:
  CARRIE GAILING,
  ANN BAKER.